(12) United States Patent
Takahashi et al.

(10) Patent No.: US 8,576,545 B2
(45) Date of Patent: Nov. 5, 2013

(54) SWITCHGEAR

(75) Inventors: Keiichi Takahashi, Hitachinaka (JP); Kenji Tsuchiya, Hitachi (JP); Ayumu Morita, Hitachi (JP); Masato Kobayashi, Hitachi (JP); Daisuke Sugai, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 266 days.

(21) Appl. No.: 13/209,470

(22) Filed: Aug. 15, 2011

(65) Prior Publication Data

US 2012/0044616 A1  Feb. 23, 2012

(30) Foreign Application Priority Data

Aug. 23, 2010  (JP) ................................ 2010-186091

(51) Int. Cl.
*H02B 5/00*  (2006.01)

(52) U.S. Cl.
USPC ............................ 361/621; 361/605; 361/611

(58) Field of Classification Search
None
See application file for complete search history.

(56) References Cited

U.S. PATENT DOCUMENTS

| | | | | |
|---|---|---|---|---|
| 5,450,280 | A * | 9/1995 | Wactor | 361/606 |
| 6,490,149 | B2 * | 12/2002 | Shichida et al. | 361/605 |
| 6,777,627 | B1 * | 8/2004 | Stevenson | 200/50.21 |
| 6,865,072 | B2 * | 3/2005 | Sato et al. | 361/619 |
| 7,158,369 | B2 * | 1/2007 | Lammers | 361/604 |
| 7,417,846 | B2 * | 8/2008 | Arioka | 361/612 |
| 7,813,090 | B2 * | 10/2010 | Suzuki et al. | 361/35 |
| 2009/0159569 | A1 | 6/2009 | Kurogi et al. | |
| 2012/0002363 | A1 | 1/2012 | Tatsukami et al. | |

FOREIGN PATENT DOCUMENTS

| | | |
|---|---|---|
| EP | 2 187 416 A1 | 11/2010 |
| JP | 6-12948 | 1/1994 |
| JP | 2007-104753 | 4/2007 |
| JP | 2008-245409 A | 10/2008 |
| JP | 2009-106030 A | 5/2009 |
| JP | 2009-171833 A | 7/2009 |
| JP | 2010-017051 | 1/2010 |
| KR | 10-2009-0066231 | 6/2009 |

OTHER PUBLICATIONS

JP Office Action of Appln. No. 2010-186091 dated Oct. 16, 2012 with partial English translation.
Korean office action of Appln. No. 10-2011-82607 dated Jan. 11, 2013 with partial English translation.
EP Search Report of Appln. No. 11178129 dated Jul. 17, 2012 in English.
Korean Office Action of dated Jul. 27, 2012.

* cited by examiner

*Primary Examiner* — Boris Chervinsky
(74) *Attorney, Agent, or Firm* — Antonelli, Terry, Stout & Kraus, LLP.

(57) ABSTRACT

A switchgear includes a chassis which is partitioned by metal earthed plates and includes a bus bar section located at a central portion, a switch section located below the bus bar section, a cable section located at a rear surface side, and a control section located at a front surface side; an air-insulated earthed disconnecting switch provided in the switch section; and a manipulating device. The switch section is separable from the chassis, and is configured as a case having a semi-closed structure which allows air to pass therethrough but prevents particles of oil and water from passing therethrough.

6 Claims, 6 Drawing Sheets

SWITCHGEAR

BACKGROUND OF THE INVENTION

The present invention relates to a switchgear including an air-insulated earthed disconnecting switch which performs earthing and disconnecting with air insulation.

Power receiving facilities are provided with switchgears which include a vacuum circuit breaker for cutting off load current or fault current, a disconnecting switch and an earthed switch for ensuring operator's safety during load maintenance checks, a detector for detecting system voltage or current, a protective relay, and the like.

As an example of such switchgears, JP-A-6-12948, for example, discloses a cubicle-type gas-insulated switchgear which includes a three-position earthed disconnecting switch with a rotor as a contactor and a vacuum valve in a metal container. The metal container is filled with SF6 gas as insulating gas.

BRIEF SUMMARY OF THE INVENTION

In the cubicle-type gas-insulated switchgear described above, the vacuum valve and the three-position earthed disconnecting switch are provided inside the metal container in which SF6 gas is sealed. Therefore, a bushing made of epoxy resin with high hermetic-sealing performance, which is a separate component, is required to be connected to a high-voltage cable, for example. Further, an O-ring, an O-ring groove, and the like for keeping the hermetic-sealing performance between the bushing and the metal container are required. Thus, the number of components is large, and the configuration is complicated.

Further, SF6 gas with a high global warming potential is used as an insulation medium. Therefore, there arises the problem of low environmental conformity.

Furthermore, if air insulation is adopted, there hardly arises the problem of increase in size even though the method of switching with the rotor is adopted, since SF6 gas has favorable insulation performance. On the other hand, in the case of air insulation with a low insulation performance as compared with SF6 gas, the size of the disconnecting part becomes large if the method of switching with the rotor is adopted.

Moreover, in the case of air insulation, when an arc is generated by the operation of the disconnecting switch, for example, the atmosphere temperature of the disconnecting switch rapidly increases. After the arc disappears, however, the atmosphere temperature decreases to about the ambient temperature, for example. Accordingly, in order to ensure the reliability of a device, it is necessary to prevent the disconnecting switch from being contaminated with dust and to prevent condensation from forming in the disconnecting switch.

The present invention has been made based on the aforementioned findings, and an object of the present invention is to provide a switchgear capable of achieving downsizing and ensuring high reliability even when an air insulation is adopted for a disconnecting and earthed switch.

According to the invention, as a first aspect thereof, a switchgear for connecting and disconnecting an electrical communication between a bus bar and a cable, comprises a chassis, a disconnecting switch including therein an electrode grounded electrically and air as an electrically insulating medium, and a drive device for manipulating the disconnecting switch, wherein the chassis has metallic plates grounded electrically and forming in the chassis cases of a bus bar section for receiving the bus bar, a switch section arranged under the bus bar section and containing therein the disconnecting switch and the drive device, a cable section arranged on a horizontal side with respect to the bus bar section to receive the cable and a control section arranged on another horizontal side with respect to the bus bar section to control the drive device, wherein the case of the switch section is removable from the chassis, and has a part through which the air is capable of passing between inside and outside of the case of the switch section, and a particle including at least one of oil and water is prevented from passing between the inside and the outside, and a remainder part of the case of the switch section is hermetically sealed.

As a second aspect of the invention, in the switchgear according to the first aspect, the part is a filter including a porous film through which the air is capable of passing, and the particle is prevented from passing.

As a third aspect of the invention, in the switchgear according to the aspect 1 or 2, the part faces to the case of the cable section to enable the air to pass between the inside of the switch section and an inside of the case of the cable section.

As a fourth aspect of the invention, in the switchgear according to any one of the aspects 1-3, the case of the switch section contains therein a moisture absorbent which is capable of absorbing moisture into the moisture absorbent and discharging the moisture from the moisture absorbent in accordance with a humidity in the case of the switch section.

As a fifth aspect of the invention, in the switchgear according to the aspect 4, the moisture absorbent is arranged on at least one of the metallic plates forming at least partially the case of the switch section and extending vertically.

As a sixth aspect of the invention, in the switchgear according to any one of the aspects 1-5, the cases of the bus bar section and the cable section face to each other to enable the air to pass between insides of the bus bar section and the cable section, and the cases of the bus bar section and the control section face to each other to enable the air to pass between the inside of the bus bar section and an inside of the control section.

According to the invention, since the case containing therein the disconnecting switch including therein the electrode grounded electrically and the air as the electrically insulating medium, has a partially hermetically sealed structure enabling the air to pass through the case and preventing the particle including the at least one of oil and water from passing through the case, the disconnecting switch is prevented from being contaminated with the dust and bedewing is prevented from occurring in the disconnecting switch. Therefore, although the disconnecting switch includes the air as the electrically insulating medium, downsizing and high-reliability of the switchgear are obtainable.

Other objects, features and advantages of the invention will become apparent from the following description of the embodiments of the invention taken in conjunction with the accompanying drawings.

DETAILED DESCRIPTION OF THE INVENTION

Hereinafter, an embodiment of a switchgear of the present invention will be described with reference to the drawings.

Figure 1:
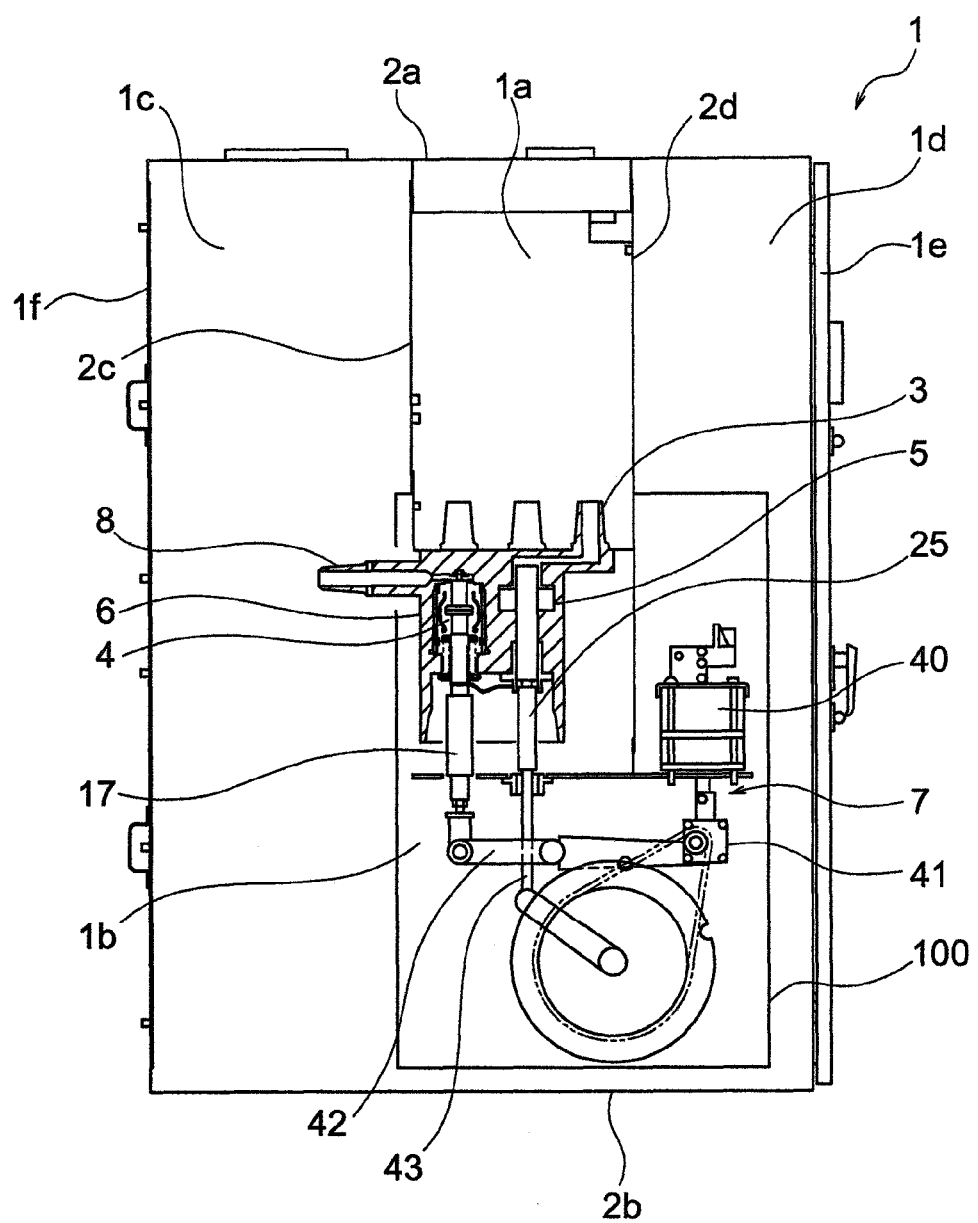
FIG. 1 is a side view showing a partial cross-section of an embodiment of a switchgear of the present invention.
Figure 2:
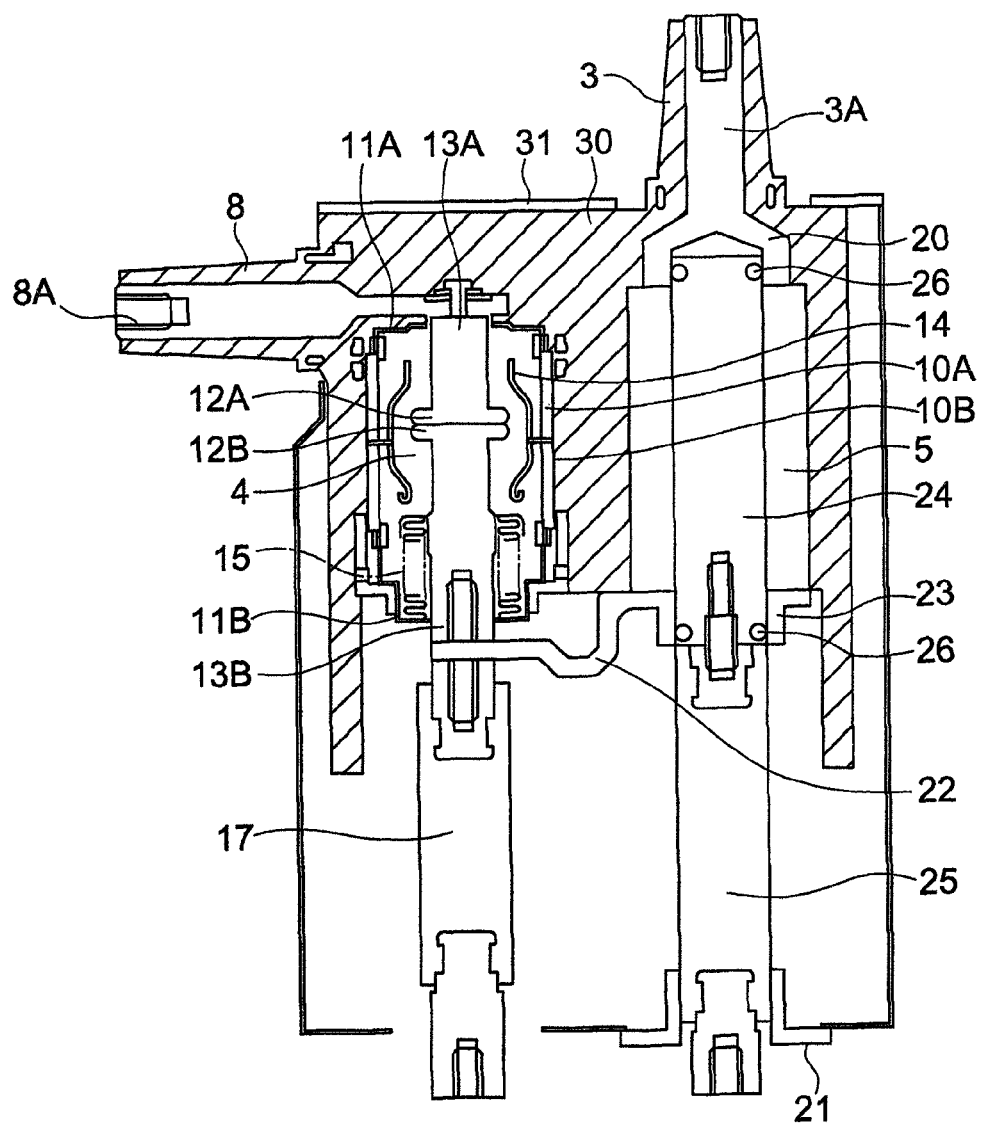
FIG. 2 is a longitudinal sectional view of a switch unit constituting an embodiment of the switchgear of the present invention in a closing mode.

FIGS. 1 and 2 show an embodiment of the switchgear of the present invention. FIG. 1 is a side view showing a partial cross-section of an embodiment of the switchgear of the present invention. FIG. 2 is a front sectional view showing a switch unit constituting an embodiment of the switchgear of the present invention in a closing mode.

Referring to FIG. 1, a chassis 1 of the switchgear is partitioned into a bus bar section 1a, a switch section 1b, a cable section 1c, and a control section 1d by metal earthed plates disposed therein. At the front side (right side of FIG. 1) of the chassis 1, a single swinging front door 1e is provided. At the rear surface side (left side of FIG. 1) of the chassis 1, a demountable rear side panel if is provided.

The bus bar section 1a is disposed on the upper side near the center in the depth direction (horizontal direction in FIG. 1) of the chassis 1. The switch section 1b is disposed below the bus bar section 1a. The cable section 1c is disposed on the rear surface side (left side in FIG. 1) of the chassis 1. The control section 1d is disposed on the upper side of the rear surface of the front door 1e and is located at a position facing the bus bar section 1a.

The sections described above are partitioned and formed by a base plate 2a and a top plate 2b, which are plate shaped and basically formed of a metal earthed plate, and right and left side plates for sealing between the base plate 2a and the top plate 2b.

At a boundary between an upper portion of the cable section 1c and the bus bar section 1a, a metal earthed plate 2c is provided. In the bus bar section 1a, a three-phase bus bar (not shown) is disposed in parallel (in a direction perpendicular to the plane of FIG. 1) with the front surface of the chassis 1 through a bus bar-connecting bushing 3 serving as a connection member.

In this embodiment, the switch section 1b is configured as a case having a semi-closed structure in which a switch unit 6 including a vacuum valve (vacuum breaker/disconnecting switch) 4 and an earthed disconnecting switch (air-insulated earthed switch) 5, and an manipulating device 7 are assembled into a frame. The switch section 1b is delivered from the chassis 1 during replacement and maintenance of components. The details thereof will be described later.

The cable section 1c includes a cable-connecting bushing 8 which is connected to fixed contact points of the vacuum valve (vacuum breaker/disconnecting switch) 4 and is introduced in the cable section 1c, a cable head (not shown) mountable to the cable-connecting bushing 8, and a cable (not shown) connected to the cable-connecting bushing 8 through the cable head.

At a boundary between an upper portion of the bus bar section 1a and the control section 1d, a metal earthed plate 2d is provided. In the control section 1d, a control portion composed of a capacitor, a protective relay, and the like (not shown) is disposed at the rear surface side of the front surface side door 1e.

As described above, the bus bar section 1a, the cable section 1c, and the control section 1d are independent from each other. However, air for cooling each device in each section communicates with the sections and flows toward a discharge port (not shown) of the chassis 1.

Next, the detailed configuration of the switch unit 6 constituting an embodiment of the switchgear of the present invention will be described with reference to FIG. 2. As shown in FIG. 2, the switch unit 6 includes a vacuum valve 4, an earthed disconnecting switch 5, a bus bar-connecting bushing 3, and a cable-connecting bushing 8, which are provided in an earthed metal container 31 and are integrally casted with a solid insulator 30 of epoxy or the like.

The vacuum valve 4 includes a fixed side electrode 12A, a movable side electrode 12B, a fixed side holder 13A connected to the fixed side electrode 12A, a movable side holder 13B connected to the movable side electrode 12B, and an arc shield 14 for protecting a ceramics insulating cylinder from arc, which are arranged in a vacuum container composed of a fixed side ceramics insulating cylinder 10A, a movable side ceramics insulating cylinder 10B, a fixed side end plate 11A, and a movable side end plate 11B. The fixed side holder 13A is connected to a cable-connecting bushing central conductor 8A so that power can be supplied to a load side. Further, a bellows 15 is disposed at a movable side for achieving the movability of the movable side holder 13B. The vacuum valve 4 switches a closing mode and a breaking mode by allowing the movable side electrode 12B and the movable side holder 13B to move in the axial direction while maintaining vacuum of the inside with the bellows 15 connected to the movable side end plate 11B and the movable side holder 13B.

The earthed disconnecting switch 5 includes a bushing side fixed electrode 20 which is connected to a bus bar side via a bus-connecting bushing central conductor 3A, an earthed side fixed electrode 21 which is set at a ground potential, and an intermediate fixed electrode 23 which is located midway between the bushing side fixed electrode 20 and the earthed side fixed electrode 21 and is electrically connected to the movable side holder 13B at the vacuum valve 4 side via a flexible conductor 22. The inside of the earthed disconnecting switch 5 is air insulated. Further, these fixed electrodes are linearly disposed, and the inside diameters thereof are equal to each other. A movable electrode 24 of the earthed disconnecting switch linearly moves in the earthed disconnecting switch 5 with respect to these fixed electrodes, thereby enabling the earthed disconnecting switch 5 to be switched to three positions of closing, disconnecting, and earthed. The movable electrode 24 of the disconnecting switch is connected to an air-insulated operating rod 25 for the earthed disconnecting switch, which is connected to an operating mechanism of the manipulating device 7 shown in FIG. 1. The contact portion of the movable electrode 24 of the earthed disconnecting switch, which comes into contact with the aforementioned fixed contact points, is configured by spring contact points 26. Thus, the movability of the movable electrode 24 of the earthed disconnecting switch is not hindered, and more reliable contact can be obtained by elastic force.

The switch unit 6 shown in FIG. 2 is composed of the vacuum valve 4 having at least a pair of separable contact points; the earthed disconnecting switch 5; the cable-connecting bushing 8 which is connected to the fixed side electrode 12A and the fixed side holder 13A of the vacuum valve 4; the bus bar-connecting bushing 3 which is connected to the bushing side fixed electrode 20 of the earthed disconnecting switch 5; the flexible conductor 22 which connects the intermediate fixed electrode 23 of the earthed disconnecting switch 5 with the movable side of the vacuum valve 4; an air-insulated operating rod 17 for the vacuum valve which is mechanically connected to the movable side electrode 12B and the movable side holder 13B of the vacuum valve 4; and the air-insulated operating rod 25 for the earthed disconnecting switch which is mechanically connected to the movable electrode 24 of the earthed disconnecting switch. The earthed disconnecting switch 5 is provided in the atmosphere and includes the movable electrode 24 of the earthed disconnecting switch which can be linearly displaced to three positions; the bushing side fixed electrode 20 and the intermediate fixed electrode 23, which are rendered electrically conductive via the movable electrode 24 of the earthed disconnecting switch in the closing position of the movable electrode 24 of the earthed disconnecting switch; and the earthed side fixed electrode 21 which is rendered electrically conductive to the intermediate fixed electrode 23 via the movable electrode 24 of the earthed disconnecting switch in the earthed position of the movable electrode 24 of the earthed disconnecting switch. The vacuum valve 4, the bushing side fixed electrode 20 for the earthed disconnecting switch, the bus bar-connecting bushing 3, and the cable-connecting bushing 8 are integrally casted with the solid insulator 30.

The bus bar-connecting bushing 3 is configured by covering the periphery of the bus bar-connecting bushing central conductor 3A with the solid insulator 30. The cable-connecting bushing 8 is configured by covering the periphery of the cable-connecting bushing central conductor 8A with the solid insulator 30.

Figure 3:
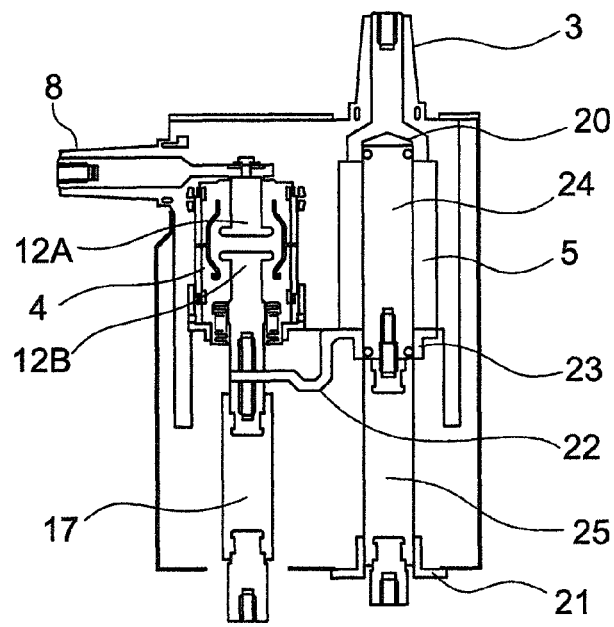
FIG. 3 is a longitudinal sectional view for explaining an operation in a breaking mode of the switch unit shown in FIG. 2.
Figure 4:
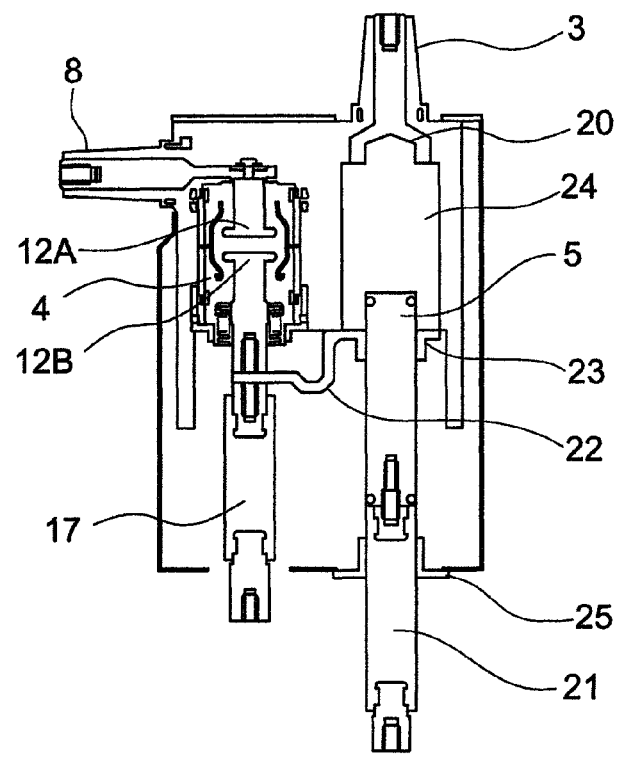
FIG. 4 is a longitudinal sectional view for explaining an operation in a disconnecting mode of the switch unit shown in FIG. 2.
Figure 5:
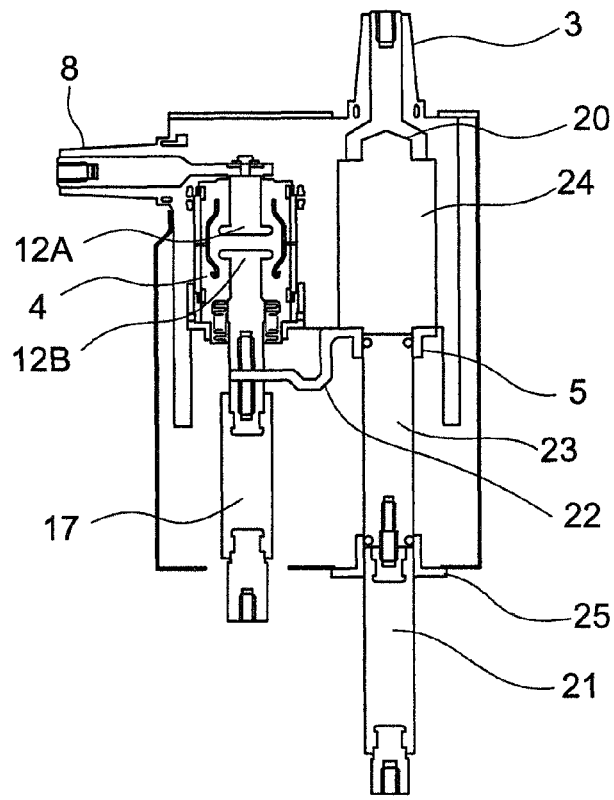
FIG. 5 is a longitudinal sectional view for explaining an operation in a pre-earthed mode of the switch unit shown in FIG. 2.
Figure 6:
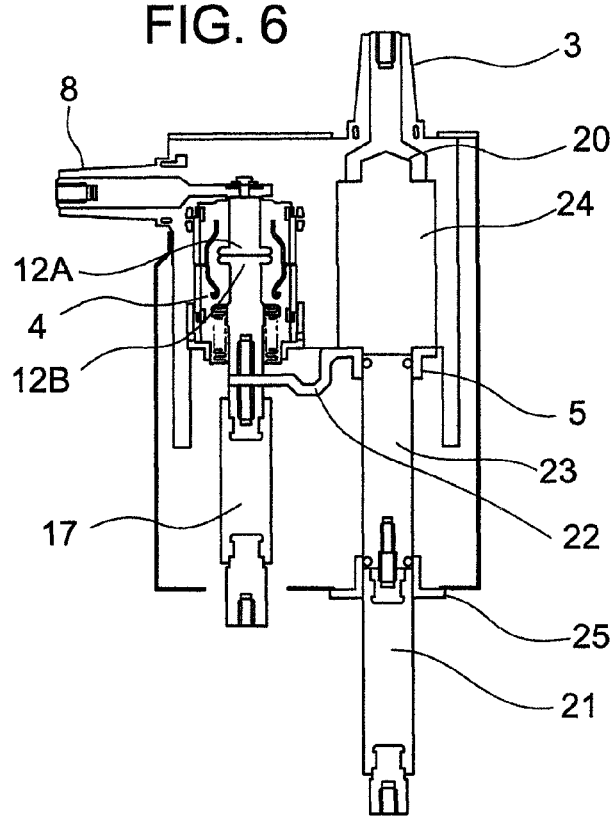
FIG. 6 is a longitudinal sectional view for explaining an operation in an earthed mode of the switch unit shown in FIG. 2.

Next, the operation of the switch unit 6 constituting an embodiment of the switchgear of the present invention will be described with reference to FIGS. 3 to 6. FIG. 3 is a longitudinal sectional view for explaining the operation in the breaking mode of the switch unit shown in FIG. 2. FIG. 4 is a longitudinal sectional view for explaining the operation in the disconnecting mode of the switch unit shown in FIG. 2. FIG. 5 is a longitudinal sectional view for explaining the operation in the pre-earthed mode of the switch unit shown in FIG. 2. FIG. 6 is a longitudinal sectional view for explaining the operation in the earthed mode of the switch unit shown in FIG. 2. In FIGS. 3 to 6, the same reference numerals as those of FIGS. 1 and 2 denote the identical or corresponding parts, so the description thereof is omitted.

FIG. 3 shows the breaking mode of the switch unit 6. In the closing mode of the switch unit 6 shown in FIG. 2, a load current is supplied to the cable-connecting bushing 8 from the bus bar-connecting bushing 3 via the earthed disconnecting switch 5 and the vacuum valve 4. When a short-circuit occurs in this mode at the load side which is connected to the cable-connecting bushing 8, and then a large fault current flows, the fault current is broken by breaking the vacuum valve 4 as shown in FIG. 3.

FIG. 4 shows the disconnecting mode of the switch unit 6. The disconnecting mode is produced by driving the movable electrode 24 of the earthed disconnecting switch to the lower side of the drawing to the position where the movable electrode 24 of the earthed disconnecting switch and the bushing side fixed electrode 20 are not rendered electrically conductive; the movable electrode 24 of the earthed disconnecting switch and the earthed side fixed electrode 21 are not rendered electrically conductive; a gap between the movable electrode 24 of the earthed disconnecting switch and the bushing side fixed electrode 20 is large; and a gap between the movable electrode 24 of the earthed disconnecting switch and the earthed side fixed electrode 21 is small.

In this mode, the bus bar-connecting bushing 3 and the cable-connecting bushing 8 are disconnected at two points of the vacuum valve 4 and the earthed disconnecting switch 5. Therefore, high reliability is obtained. Further, a withstand voltage between the movable electrode 24 of the earthed disconnecting switch and the earthed side fixed electrode 21 is designed to be lower than a withstand voltage between the fixed side electrode 12A and the movable side electrode 12B of the vacuum valve 4, thereby making it possible to provide a highly reliable structure with ground preference.

FIG. 5 shows a pre-earthed mode of the switch unit 6. As shown in FIG. 5, when the movable electrode 24 of the earthed disconnecting switch is driven to the lower side of the drawing to the position where the movable electrode 24 of the earthed disconnecting switch and the earthed side fixed electrode 21 are in contact with each other, the movable electrode 24 of the earthed disconnecting switch, the flexible conductor 22, and the movable side electrode 12B are set at ground potential, and a potential difference with the load side is applied between the electrodes in the vacuum valve 4.

FIG. 6 shows the earthed mode of the switch unit 6. By further closing the vacuum valve 4 from the mode of the switch unit 6 shown in FIG. 5, the cable-connecting bushing 8 is earthed via the vacuum valve 4, the flexible conductor 22, the intermediate fixed electrode 23, the movable electrode 24 of the earthed disconnecting switch, and the earthed side fixed electrode 21. At this time, even if the cable-connecting bushing 8 is in the conductive state, the final closing operation is performed in the vacuum valve 4. Therefore, short-circuit current closing capacity is not required for the earthed disconnecting switch 5.

In order to return the mode of the switch unit 6 to the closing mode again from the earthed mode, the vacuum valve 4 is switched to the breaking mode firstly. After that, the movable electrode 24 of the earthed disconnecting switch is moved so that the spring contact points 26 come into contact with the bushing side fixed electrode 20. Then, the movable side electrode 12B is closed in the vacuum valve 4.

Figure 7:
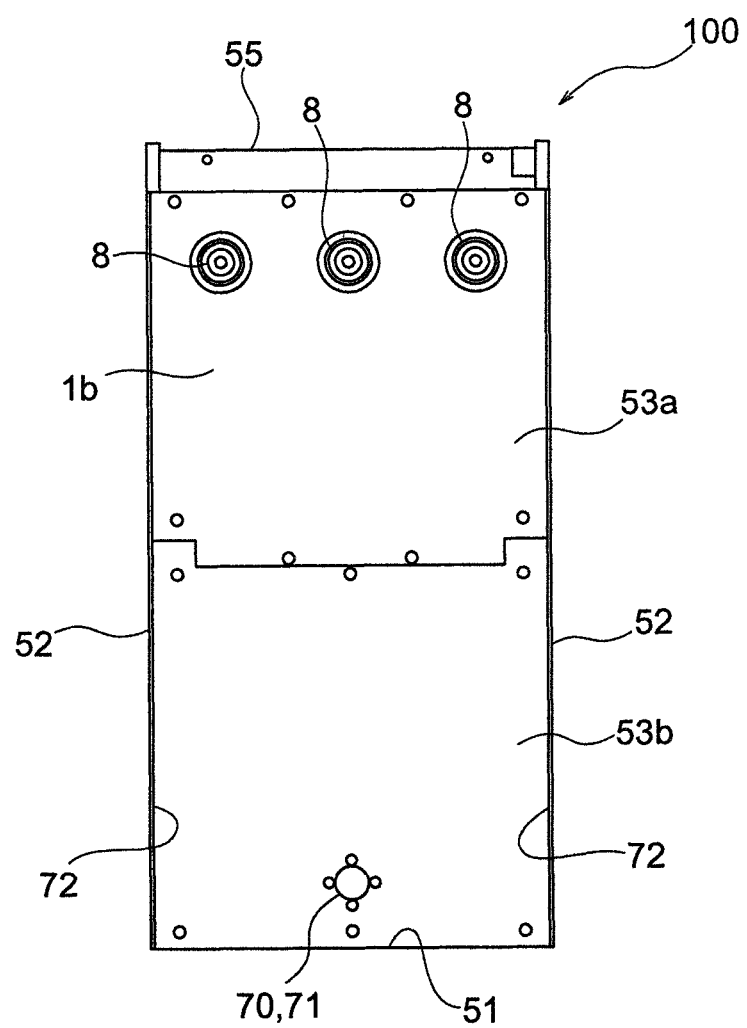
FIG. 7 is a rear side view showing the switch unit constituting an embodiment of the switchgear of the present invention.
Figure 8:
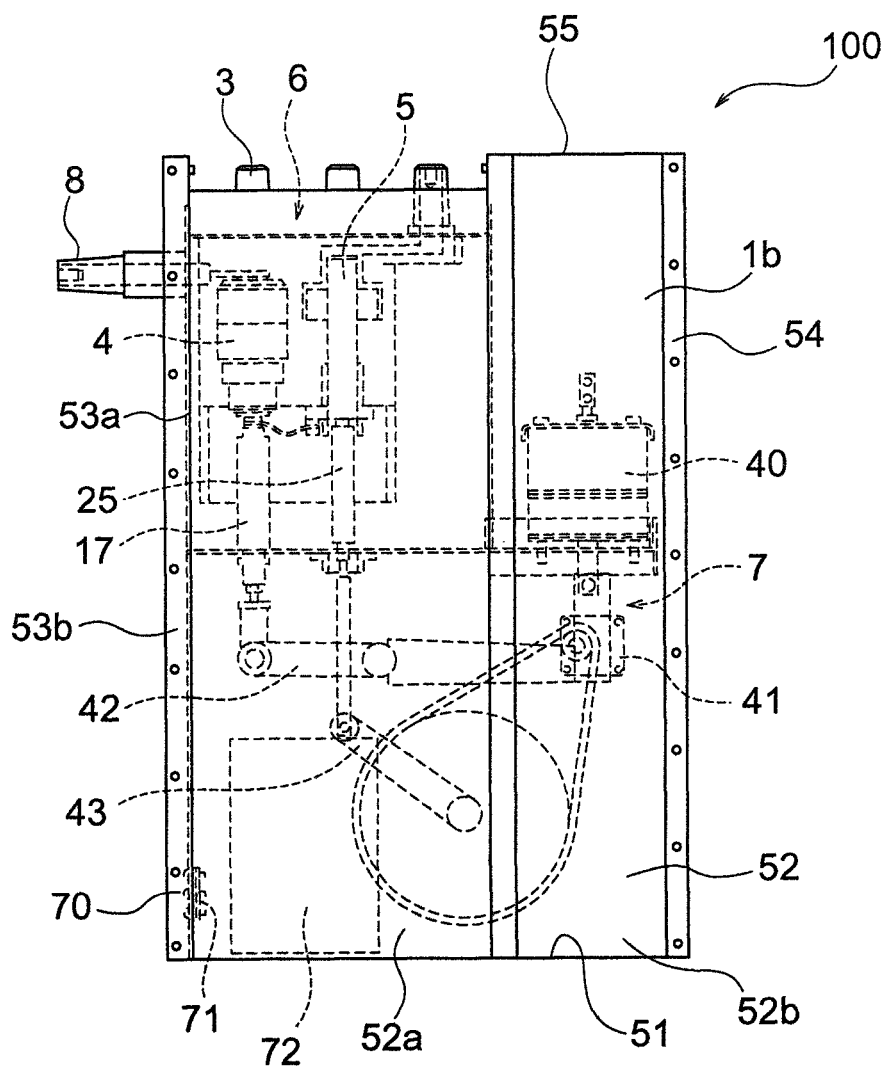
FIG. 8 is a partially perspective side view showing the switch unit constituting an embodiment of the switchgear of the present invention.

Next, the configuration of the switch section 1b including the switch unit 6 described above will be described with reference to FIGS. 1, 7, and 8. FIG. 7 is a rear side view of the switch unit constituting an embodiment of the switchgear of the present invention. FIG. 8 is a partially perspective side view of the switch unit constituting an embodiment of the switchgear of the present invention. In FIGS. 7 and 8, the same reference numerals as those of FIGS. 1 to 6 denote the identical or corresponding parts, so the description thereof is omitted.

In this embodiment, as described above, the switch section 1b is configured as a box having a semi-closed structure in which the switch unit 6 including the vacuum valve (vacuum breaker/disconnecting switch) 4 and the earthed disconnecting switch (air-insulated earthed switch) 5, and the manipulating device 7 are assembled into the frame. Three switch units 6 of a phase-separated structure are arranged side by side in a direction perpendicular to the front surface of the chassis 1, with a shielding layer (not shown) being disposed between the phases so as to suppress a short-circuiting accident from occurring between the phases (see FIG. 7).

A driving portion 40 for the vacuum valve 4 and a dividing portion 41 for the earthed disconnecting switch 5, each of which has a driving direction corresponding to the vertical direction (vertical direction in FIGS. 1 and 8), are disposed at the front side of the chassis 1 in the vicinity of the switch unit 6. The driving portions 40 and 41 are respectively connected to the air-insulated operating rod 17 for the vacuum valve and the air-insulated operating rod 25 for the earthed disconnecting switch via operating mechanisms 42 and 43. The driving portions 40 and 41 and the operating mechanisms 42 and 43 constitute the manipulating device 7.

As shown in FIGS. 7 and 8, devices such as the switch unit 6, the driving portions 40 and 41, and the operating mechanisms 42 and 43 are provided in a box 100 formed in a semi-closed structure including a filter 71.

The case 100 constituting the switch section 1b includes a bottom member 51; side members 52, 52, which are respectively provided on right and left side portions of the bottom member 51; an upper rear surface member 53a and a lower rear surface member 53b which connect the side members 52, 52 at upper and lower portions of the rear surface; a front surface member 54 provided on a front surface portion of the bottom member 51; and a top plate member 55 which forms a ceiling portion. The members 51, 52, 53, 54, and 55 are each formed of a metal earthed plate and are tightly fastened through a packing or the like with bolts and nuts, for example.

The side members 52, 52 described above are composed of a first side member 52a corresponding to the vacuum valve 4 and a side portion of the earthed disconnecting switch 5, and a second side member 52b corresponding to the driving portions 40 and 41.

As shown in FIGS. 7 and 8, the lower rear surface member 53b of the case 100 constituting the switch section 1b is provided with a suction/discharge port 70. The filter 71 is provided inside the case 100 of the suction/discharge port 70. The filter 71 is formed of a porous membrane member which allows internal and external air to pass therethrough and prevents particles of oil and water from passing therethrough. The switch section 1b communicates with the cable section 1c only via the suction/discharge port 70 and the filter 71, but does not communicate with other sections such as the bus bar section 1a and the control section 1d. The porous membrane forming the filter 71 has a number of fine through-holes. The porous membrane allows air to pass therethrough but prevents particles of oil and water from passing therethrough. In other words, the switch section 1b is formed in a semi-closed structure which allows air to pass therethrough but prevents particles of oil and water from passing therethrough. If the inside pressure of the switch section 1b is negative, air is introduced from the cable section 1c through the filter 71, while oil and water and foreign matters such as dust are prevented from entering the switch section 1b.

In order to protect the switch unit 6, which is high-pressure equipment disposed in the switch section 1b, against dust or the like, the filter 71 has a pore size of 0.1 micron or less. While air can be taken into the switch section 1b through the filter 71, the filter prevents dust from entering into the switch section 1b, thereby protecting the switch unit 6 and the manipulating device 7 against dust. The filter 71 is made of a material that allows only air to pass therethrough, such as GORE-TEX®.

Moisture absorbing/discharging members 72, 72 are respectively provided inside the first side members 52a, 52a of the case 100 constituting the switch section 1b. The moisture absorbing/discharging members 72, 72 preferably have a high moisture absorption capability and a high moisture absorption speed.

Next, the operation of an embodiment of the switchgear described above of the present invention will be described.

The filter 71 prevents condensation in the case 100 by circulating internal and external air of the case 100 of the semi-closed structure. As a result, the reliability of the earthed disconnecting switch (air-insulated earthed switch) 5 in the case 100 can be ensured.

Further, the moisture absorbing/discharging members 72, 72 rapidly absorb moisture when the humidity in the case 100 increases. On the other hand, the moisture absorbing/discharging members 72, 72 rapidly discharge moisture when the humidity decreases and the air is dried. Thus, the moisture absorbing/discharging members 72, 72 control a relative humidity change occurring with a temperature change to fall within a constant humidity range. As a result, the condensation that occurs due to a rapid temperature change in the case 100, for example, can be prevented.

Specifically, the condensation in the case 100 constituting the switch section 1b is a phenomenon as described below. That is, when a high-temperature air with a large amount of saturated vapor is cooled, a surplus vapor obtained when the air cannot contain any more vapor is condensed to water drops. Such water drops are generated in the air-insulated operating rod 25 of the earthed disconnecting switch constituting the switch unit 6 and on the inner wall of the case 100, for example. In order to prevent this condensation, it is necessary to circulate clean internal and external air having no dust and the like, and to rapidly remove a surplus vapor.

According to an embodiment of the switchgear described above of the present invention, the case 100 containing the earthed disconnecting switch (air-insulated earthed switch) 5 of the switch unit 6 is formed in a semi-closed structure, thereby preventing contamination with dust. As a result, it is possible to provide a switchgear capable of achieving downsizing and ensuring high reliability even when air insulation is adopted.

Further, according to an embodiment of the switchgear described above of the present invention, the case 100 is formed in a semi-closed structure which is achieved by providing the suction/discharge port 70 mounted with the filter 71 which allows air to pass therethrough but prevents particles of oil and water from passing therethrough. This makes it possible to prevent contamination with dust and to cool heat generated in the case 100 by the air flowing in from the cable section 1c. As a result, it is possible to provide a switchgear capable of achieving downsizing and ensuring high reliability even when air insulation is adopted.

Moreover, according to an embodiment of the switchgear described above of the present invention, the moisture absorbing/discharging members 72, 72 for controlling the humidity during a rapid temperature change are provided inside the case 100. This makes it possible to prevent condensation occurring due to a rapid temperature change in the switch section 1b. As a result, it is possible to provide a switchgear capable of achieving downsizing and ensuring high reliability even when air insulation is adopted.

In the embodiment described above, the suction/discharge port 70 of the case 100 is provided in the lower portion rear surface member 53b, but the position of the suction/discharge port 70 is not limited thereto. The suction/discharge port 70 may be provided in the upper portion rear surface member 53a, for example. In the embodiment described above, the moisture absorbing/discharging members 72, 72 are respectively provided inside the first side members 52a, 52a of the case 100, but the positions of the moisture absorbing/discharging members 72, 72 are not limited thereto. The moisture absorbing/discharging members 72, 72 may be provided anywhere inside the case 100.

The embodiment described above has illustrated an example in which the moisture absorbing/discharging members 72, 72 are provided inside the case 100 and the suction/discharge port 70 of the case 100 is provided with the filter 71. In an application under the environment in which the temperature and humidity of the case 100 do not rapidly change, however, the moisture absorbing/discharging members 72, 72 may be omitted.

Although not described herein in detail, the illustrated configuration of an interlock and the like located midway in the manipulating device, for example, is merely a preferred embodiment and is not intended to limit the mode of the present invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A switchgear for connecting and disconnecting an electrical communication between a bus bar and a cable, comprising a chassis, a disconnecting switch including therein an electrode grounded electrically and air as an electrically insulating medium, and a drive device for manipulating the disconnecting switch, wherein the chassis has metallic plates grounded electrically and forming in the chassis cases of a bus bar section for receiving the bus bar, a switch section arranged under the bus bar section and containing therein the disconnecting switch and the drive device, a cable section arranged on a horizontal side with respect to the bus bar section to receive the cable and a control section arranged on another horizontal side with respect to the bus bar section to control the drive device, wherein the case of the switch section is removable from the chassis, and has a part through which the air is capable of passing between inside and outside of the case of the switch section, and a particle including at least one of oil and water is prevented from passing between the inside and the outside, and a remainder part of the case of the switch section is hermetically sealed.

2. The switchgear according to claim 1, wherein the part is a filter including a porous film through which the air is capable of passing, and the particle is prevented from passing.

3. The switchgear according to claim 1, wherein the part faces to the case of the cable section to enable the air to pass between the inside of the switch section and an inside of the case of the cable section.

4. The switchgear according to claim 1, wherein the case of the switch section contains therein a moisture absorbent which is capable of absorbing moisture into the moisture absorbent and discharging the moisture from the moisture absorbent in accordance with a humidity in the case of the switch section.

5. The switchgear according to according to claim 4, wherein the moisture absorbent is arranged on at least one of the metallic plates forming at least partially the case of the switch section and extending vertically.

6. The switchgear according to claim 1, wherein the cases of the bus bar section and the cable section face to each other to enable the air to pass between insides of the bus bar section and the cable section, and the cases of the bus bar section and the control section face to each other to enable the air to pass between the inside of the bus bar section and an inside of the control section.

* * * * *